US012661845B2

(12) United States Patent
Kato et al.

(10) Patent No.: US 12,661,845 B2
(45) Date of Patent: Jun. 23, 2026

(54) LINK MECHANISM, LINK DEVICE, AND STRETCHING MACHINE

(71) Applicant: THE JAPAN STEEL WORKS, LTD., Tokyo (JP)

(72) Inventors: Masaki Kato, Tokyo (JP); Ichiro Nakajima, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 80 days.

(21) Appl. No.: 18/714,017

(22) PCT Filed: Jun. 22, 2022

(86) PCT No.: PCT/JP2022/024941
§ 371 (c)(1),
(2) Date: May 28, 2024

(87) PCT Pub. No.: WO2023/105823
PCT Pub. Date: Jun. 15, 2023

(65) Prior Publication Data
US 2025/0026071 A1     Jan. 23, 2025

(30) Foreign Application Priority Data
Dec. 7, 2021    (JP) ................................. 2021-198460

(51) Int. Cl.
B29C 55/16          (2006.01)
B29C 55/20          (2006.01)
(52) U.S. Cl.
CPC ............ B29C 55/165 (2013.01); B29C 55/20 (2013.01)
(58) Field of Classification Search
None
See application file for complete search history.

(56) References Cited

U.S. PATENT DOCUMENTS

| | | |
|---|---|---|
| 2001/0012417 A1 | 8/2001 | Kashiwagi et al. |
| 2003/0070465 A1 | 4/2003 | Kashiwagi et al. |
| 2019/0039282 A1 | 2/2019 | Unterreiner et al. |

FOREIGN PATENT DOCUMENTS

| | | |
|---|---|---|
| JP | S62-240210 A | 10/1987 |
| JP | H10-324237 A | 12/1998 |

(Continued)

OTHER PUBLICATIONS

Tsuboi JPH10324237A English Translation 1998 (Year: 1998).*

(Continued)

*Primary Examiner* — Jacob T Minskey
*Assistant Examiner* — Adrien J Bernard
(74) *Attorney, Agent, or Firm* — Potomac Law Group, PLLC

(57)          ABSTRACT

A link mechanism 11 according to an embodiment includes a base member 25, an outer rail holder 24a provided on one end side of the base member 25 and including guide rollers 41 and 42 moving along a rail 14, an inner rail holder 24b provided on the other end side of the base member 25 and including guide rollers 41 and 42 moving along another rail 13 provided on an inner side of the rail 14, link plates 22 and 23 each having one end rotatably coupled to the outer rail holder 24a and the other end rotatably coupled to another link mechanism 11, and a clip 21 provided on the one end side of the base member 25 where the outer rail holder 24a is provided and configured to grip the film. The outer rail holder 24a includes a roller cover 50 configured to cover at least one of the guide rollers 41 and 42 moving along the rail 14.

9 Claims, 13 Drawing Sheets

(56) References Cited

FOREIGN PATENT DOCUMENTS

| JP | 2001-227539 | A | 8/2001 |
| JP | 2005-246956 | A | 9/2005 |
| JP | 4379306 | B2 | 10/2009 |
| JP | 2017-024251 | A | 2/2017 |
| JP | 2018-161825 | A | 10/2018 |
| JP | 2019-025916 | A | 2/2019 |

OTHER PUBLICATIONS

Kashiwaga JP2001227539A English Translation 2001 (Year: 2001).*
Ueda JP2005246956A English Translation 2005 (Year: 2005).*
International Search Report for International Patent Application No. PCT/JP2022/024941, Sep. 13, 2022.
Office Action issued Nov. 25, 2025, in Japanese Patent Application No. 2021-198460.

* cited by examiner

13a(14a)

13a(14a)

LINK MECHANISM, LINK DEVICE, AND STRETCHING MACHINE

TECHNICAL FIELD

The present invention relates to a link mechanism, a link device, and a stretching machine.

BACKGROUND ART

A stretching machine configured to stretch a sheet, a film, or the like in a longitudinal direction and a transverse direction while conveying it has been known. For example, Patent Document 1 discloses a simultaneous biaxial stretching machine in which longitudinal stretching and transverse stretching of a sheet-like material are performed simultaneously. The simultaneous biaxial stretching machine disclosed in Patent Document 1 includes an endless link device, and the endless link device includes an equal-length link device formed like a folding scale.

The equal-length link device disclosed in Patent Document 1 includes rails and a plurality of rollers that move on the rails while rotating.

RELATED ART DOCUMENTS

Patent Documents

Patent Document 1: Japanese Patent No. 4379306

SUMMARY OF THE INVENTION

Problems to be Solved by the Invention

It has been desired to prevent rail wear to be a cause of vibrations in a stretching machine.

Other objects and novel features will be apparent from the description of this specification and the accompanying drawings.

Means for Solving the Problems

According to an embodiment, a link mechanism constitutes a link device used in a stretching machine configured to stretch a film. The link mechanism includes an outer rail holder including a plurality of guide rollers moving along a first rail and an inner rail holder including a plurality of guide rollers moving along a second rail provided on an inner side of the first rail, and the outer rail holder includes a roller cover configured to cover at least one of the plurality of guide rollers moving along the first rail.

Effects of the Invention

According to the embodiment, it is possible to reduce the rail wear to be a cause of vibrations in a stretching machine.

BRIEF DESCRIPTIONS OF THE DRAWINGS

DETAILED DESCRIPTION OF PREFERRED EMBODIMENTS

Figure 1:
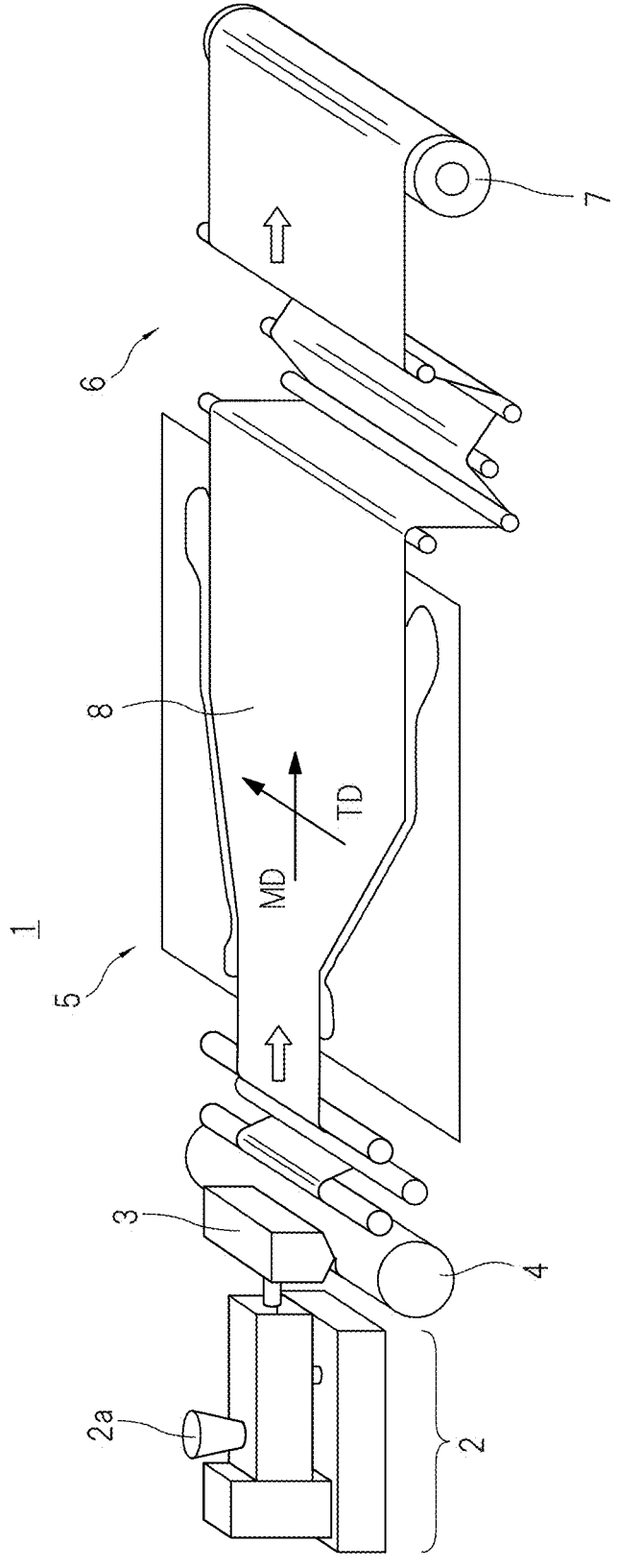
FIG. 1 is a schematic view showing a configuration of a thin-film manufacturing system according to an embodiment.

Hereinafter, an embodiment will be described in detail with reference to the drawings. Note that the members having the same or substantially the same function are denoted by the same reference characters throughout the drawings for describing the embodiment, and the repetitive description thereof will be omitted.

<Configuration of Manufacturing System>

FIG. 1 is a schematic view showing a configuration of a thin-film manufacturing system including a stretching machine. A thin-film manufacturing system 1 shown in FIG. 1 includes an extrusion apparatus (extruder, kneading extruder) 2, a T-die 3, a raw sheet cooling apparatus 4, a stretching machine 5, a take-off apparatus 6, and a winder apparatus 7.

In the thin-film manufacturing system 1, a thin film is manufactured through the following process. First, a raw material is supplied to a material supply unit (material supply port, hopper) 2*a* of the extrusion apparatus 2. The raw material to be supplied to the extrusion apparatus 2 contains a resin material (for example, thermoplastic resin material in pellet shape), additives, and the like.

The raw material supplied to the extrusion apparatus 2 is transported (conveyed) while being kneaded (mixed). Specifically, the raw material supplied to the extrusion apparatus 2 is melted and kneaded while being sent forward by the rotation of a screw in the extrusion apparatus 2. The raw material kneaded by the extrusion apparatus 2 (kneaded material) is supplied to the T-die 3. The kneaded material supplied to the T-die 3 is extruded toward the raw sheet cooling apparatus 4 through a slit of the T-die 3. The kneaded material supplied from the extrusion apparatus 2 to the T-die 3 is formed into a predetermined shape (in this case, film-like shape) by passing through the T-die 3.

The kneaded material extruded from the T-die 3 is cooled to be a film 8 in the raw sheet cooling apparatus 4. The film 8 is a resin film in a solidified state (solid state). More specifically, the film 8 is a thermoplastic resin film. The film 8 is continuously extruded from the T-die 3. As a result, the film 8 is continuously supplied to the stretching machine 5.

The film 8 supplied to the stretching machine 5 is stretched in an MD direction and a TD direction by the stretching machine 5. The film 8 subjected to a stretching process (stretching treatment) by the stretching machine 5 is conveyed to the winder apparatus 7 via the take-off apparatus 6 and is wound by the winder apparatus 7. The film 8 wound by the winder apparatus 7 is cut as needed.

The thin-film manufacturing system 1 shown in FIG. 1 manufactures a thin film through the process described above. Understandably, the thin-film manufacturing system 1 can be modified in various ways in accordance with the properties and the like of the thin film to be manufactured. For example, an extraction tank may be provided near the take-off apparatus 6 shown in FIG. 1, and a plasticizer (for example, paraffin) contained in the film 8 may be removed in some cases.

The stretching machine 5 constituting the thin-film manufacturing system 1 stretches the film 8 in the MD direction and the TD direction while conveying the film 8 in the MD direction. In other words, the MD (Machine Direction) direction is a conveying direction of the film 8. Also, the TD (Transverse Direction) direction is a direction that intersects the conveying direction of the film 8. Thus, in the following description, the MD direction is referred to as a "conveying direction" or a "longitudinal direction", and the TD direction is referred to as a "transverse direction" in some cases. The MD direction (conveying direction, longitudinal direction) and the TD direction (transverse direction) are the directions intersecting each other, and are more specifically the directions orthogonal to each other. Namely, the stretching machine 5 is a stretching machine capable of simultaneously stretching the film 8 in two directions intersecting each other while conveying the film 8, and is referred to as a "simultaneous biaxial stretching machine" in general.

<Stretching Machine>

Figure 2:
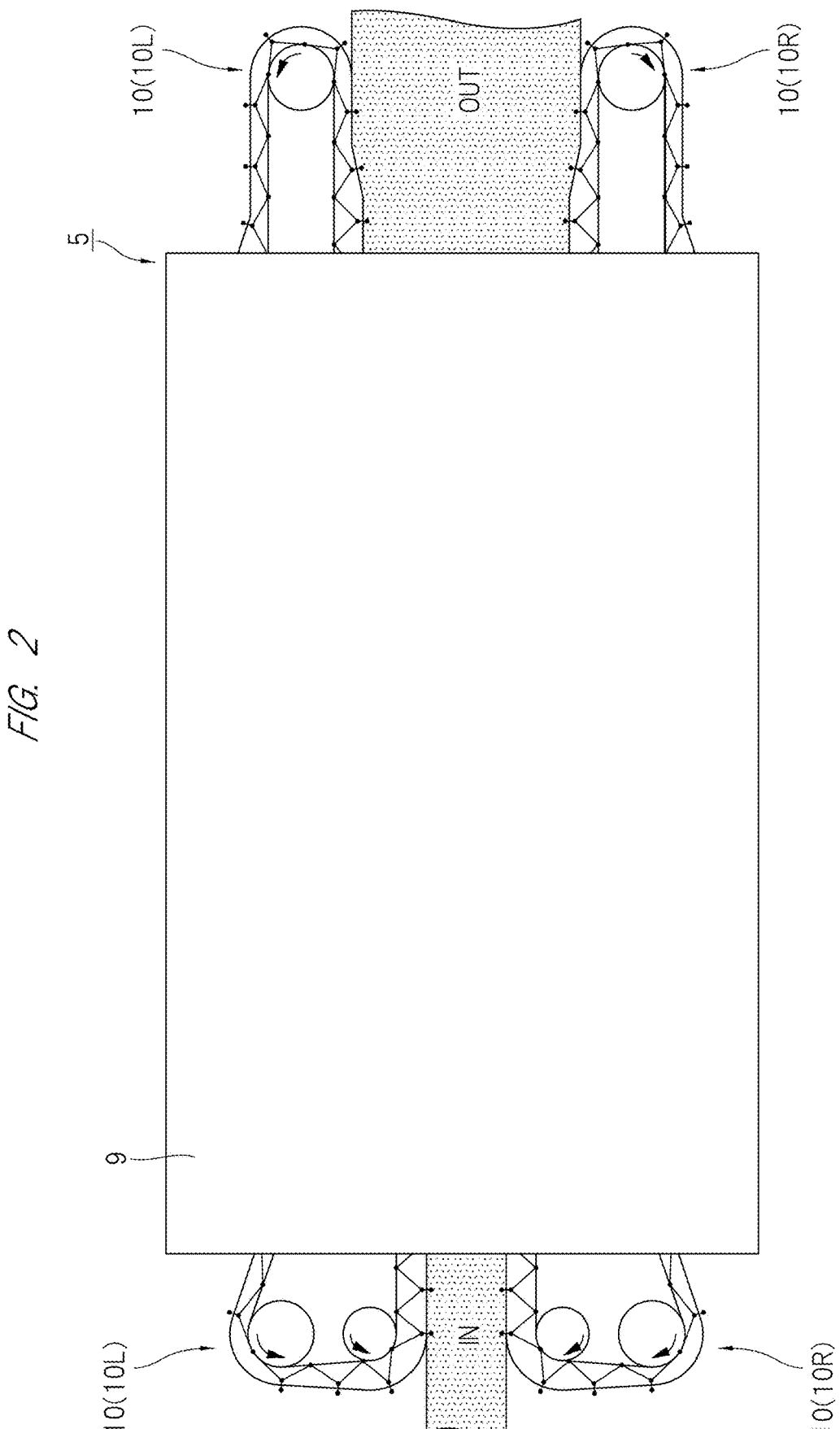
FIG. 2 is a plan view schematically showing a structure of a stretching machine constituting the thin-film manufacturing system.
Figure 3:
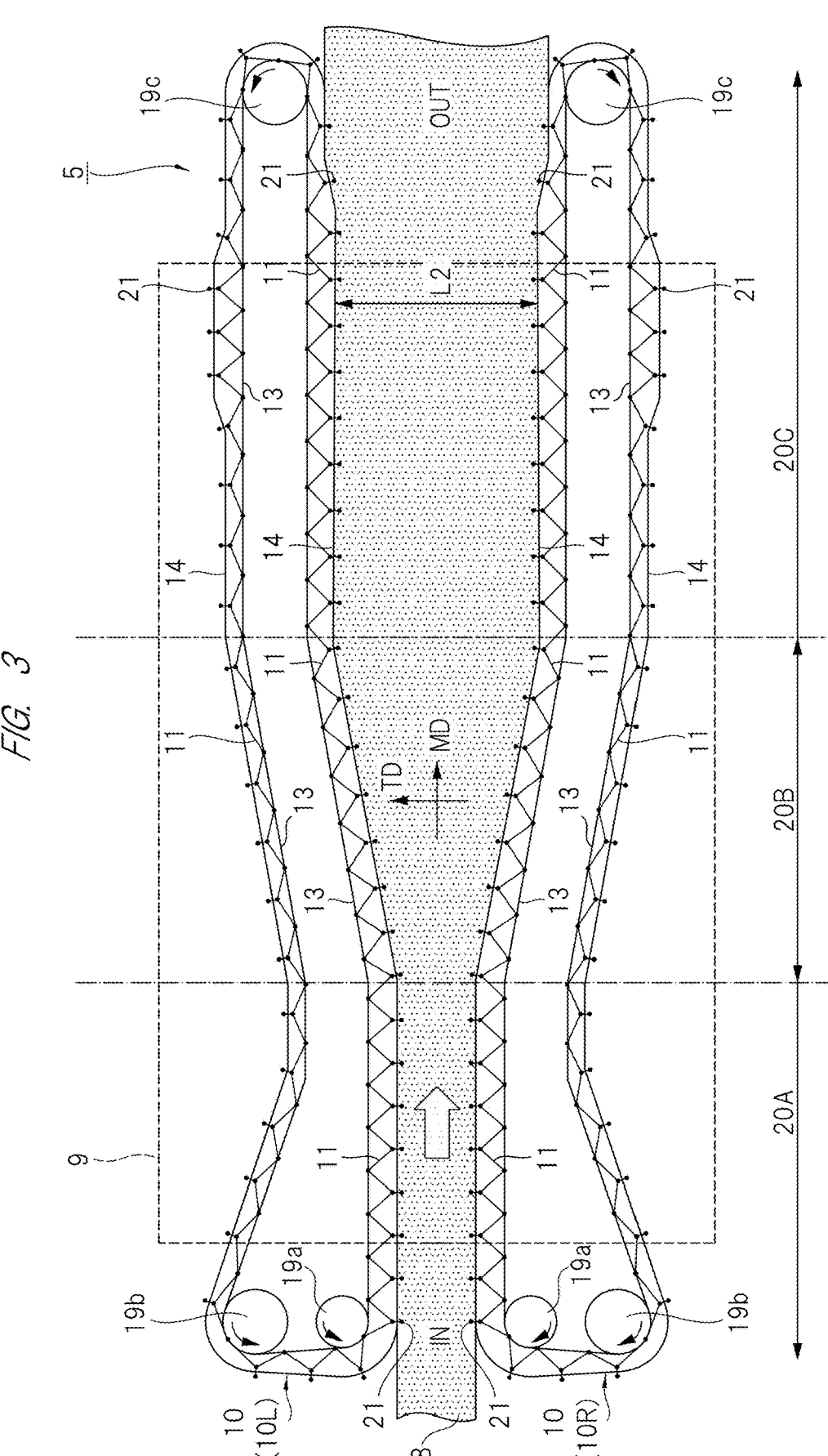
FIG. 3 is another plan view schematically showing the structure of the stretching machine constituting the thin-film manufacturing system.

Next, the stretching machine 5 will be described in more detail. FIG. 2 and FIG. 3 are plan views schematically showing the structure of the stretching machine 5. The stretching machine 5 has a pair of link devices 10. The pair of link devices 10 are separated from each other in plan view. In the following description, one of the pair of link devices 10 is referred to as a "link device 10R" and the other of the pair of link devices 10 is referred to as a "link device 10L" for distinction in some cases. Understandably, such a distinction is merely for convenience of description.

In FIG. 2 and FIG. 3, the link device 10R is disposed on a right side (R side) with respect to the conveying direction (MD direction), and the link device 10L is disposed on a left side (L side) with respect to the conveying direction (MD direction). The link device 10R and the link device 10L are separated from each other in the TD direction and face each other in the TD direction with the film 8 interposed therebetween.

The film 8 is conveyed through the space between the link device 10R and the link device 10L in the MD direction. In other words, the space between the link device 10R and the link device 10L facing each other is used as a conveyance path for conveying the film 8.

Referring to FIG. 3, the stretching machine 5 is divided into three regions 20A, 20B, and 20C along the conveying direction (MD direction). The region 20A serves as a preheating region, the region 20B serves as a stretching region, and the region 20C serves as a heat setting region. The preheating region 20A, the stretching region 20B, and the heat setting region 20C are arranged in this order in the conveying direction (MD direction).

The inlet of the film 8 in the stretching machine 5 (portion indicated by "IN" in FIG. 2 and FIG. 3) is present in the preheating region 20A. Also, the outlet of the film 8 in the stretching machine 5 (portion indicated by "OUT" in FIG. 2 and FIG. 3) is present in the heat setting region 20C. Further, the stretching region 20B in which the stretching process is performed is present between the preheating region 20A in which the inlet of the film 8 is present and the heat setting region 20C in which the outlet of the film 8 is present.

A heat treatment unit 9 covers a part of the preheating region 20A, all of the stretching region 20B, and a part of the heat setting region 20C. Also, the heat treatment unit 9 covers the central parts of the link devices 10R and 10L, and heats the film 8 conveyed by the link devices 10R and 10L. The heat treatment unit 9 in the present embodiment is composed of an oven capable of heating the film 8 to a desired temperature. The film 8 passes through the inside of the oven as the heat treatment unit 9 while being gripped by the link devices 10R and 10L.

<Link Device>

Each of the link devices 10R and 10L includes a plurality of link mechanisms 11 coupled to constitute an endless chain, and each of the link mechanisms 11 has a clip 21 configured to grip the film 8. The film 8 is held by the clips 21 in the link mechanisms 11 constituting the link device 10R and the clips 21 in the link mechanisms 11 constituting the link device 10L. Namely, one side (right side/R side) of the film 8 is gripped by the plurality of clips 21 in the link device 10R, and the other side (left side/L side) of the film 8 is gripped by the plurality of clips 21 in the link device 10L.

Each of the link devices 10R and 10L further includes a pair of rails 13 and 14 disposed on a support table (bed) in addition to the plurality of link mechanisms 11. In each of the link devices 10R and 10L, the rail 13 is disposed on an inner side of the rail 14. In other words, the rail 14 is disposed on an outer side of the rail 13. Thus, the rail 13 is referred to as an "inner rail", and the rail 14 is referred to as an "outer rail" in some cases. Furthermore, the rail 13 is referred to also as a "reference rail" or an "SP rail", and the rail 14 is referred to also as an "MD rail" in some cases.

The rails 13 and 14 provided in each of the link devices 10R and 10L are configured of a plurality of partial rails coupled to each other, and are annularly disposed over the preheating region 20A, the stretching region 20B, and the heat setting region 20C. More specifically, the rails 13 and 14 are annularly disposed by being turned back in the preheating region 20A where the inlet of the film 8 is present and turned back in the heat setting region 20C where the outlet of the film 8 is present.

Three sprockets 19a, 19b, and 19c are provided on the inner side of the rail 13 of the link device 10R. Similarly, three sprockets 19a, 19b, and 19c are provided on the inner side of the rail 13 of the link device 10L. The sprockets 19a and 19b of each of the link devices 10R and 10L are disposed in the preheating region 20A, and the sprocket 19c of each of the link devices 10R and 10L is disposed in the heat setting region 20C. Understandably, the sprockets 19a and 19b are disposed outside the heat treatment unit 9 that covers a part of the preheating region 20A. Further, the sprockets 19c are disposed outside the heat treatment unit 9 that covers a part of the heat setting region 20C. Namely, the sprockets 19a, 19b, and 19c of each of the link devices 10R and 10L are disposed outside the oven as the heat treatment unit 9.

The plurality of link mechanisms 11 in the link devices 10R and 10L are disposed on the rails 13 and 14 and move along the rails 13 and 14. The sprockets 19a, 19b, and 19c of the link device 10R shown in FIG. 3 engage with the plurality of link mechanisms 11 of the link device 10R. Therefore, when the sprockets 19a, 19b, and 19c rotate, a driving force acts on the plurality of link mechanisms 11 of the link device 10R, and the link mechanisms 11 move (run) along the rails 13 and 14 of the link device 10R. The sprockets 19a, 19b, and 19c of the link device 10L shown in FIG. 3 engage with the plurality of link mechanisms 11 of the link device 10L. Therefore, when the sprockets 19a, 19b, and 19c rotate, a driving force acts on the plurality of link mechanisms 11 of the link device 10L, and the link mechanisms 11 move (run) along the rails 13 and 14 of the link device 10L. Namely, the rails 13 and 14 in the link devices 10R and 10L are guide rails configured to move (run) the plurality of link mechanisms 11 in a predetermined direction.

In the following description, for each of the link devices 10R and 10L shown in FIG. 3, the side facing the film 8 is referred to as a "film side", and the side opposite to the film side is referred to as a "return side" in some cases. Namely, the side on which the plurality of link mechanisms 11 move from the inlet (IN) toward the outlet (OUT) while the clips 21 are gripping the film 8 is the film side. Meanwhile, the side which is located on the opposite side of the film side and on which the plurality of link mechanisms 11 move from the outlet (OUT) toward the inlet (IN) while the clips 21 do not grip the film 8 is the return side.

A pitch between adjacent link mechanisms 11 (referred to also as "link pitch" in some cases) of the plurality of link mechanisms 11 changes in accordance with an interval (separation distance) between the rail 13 and the rail 14. In other words, the pitch between the adjacent link mechanisms 11 can be adjusted by adjusting the separation distance between the rail 13 and the rail 14.

Figure 4A:
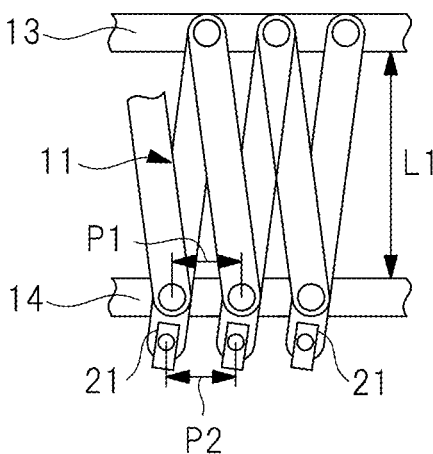
FIG. 4A is a plan view schematically showing link mechanisms and rails.
Figure 4B:
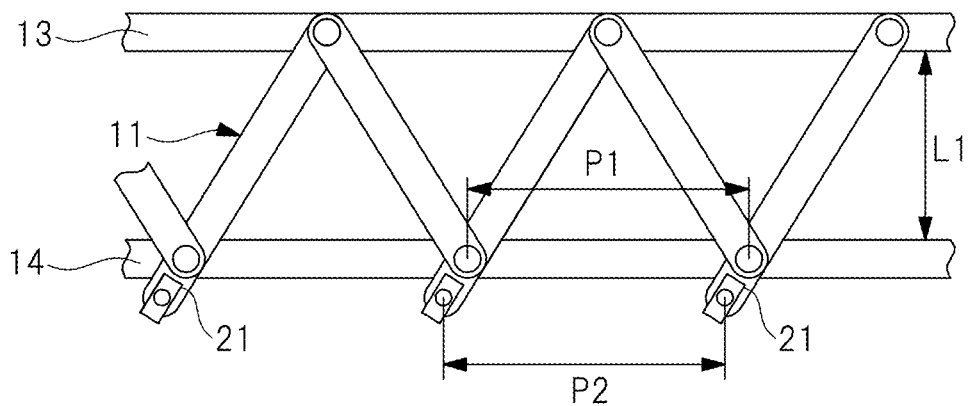
FIG. 4B is another plan view schematically showing the link mechanisms and the rails.

FIG. 4A and FIG. 4B are plan views schematically showing the link mechanisms 11 and the rails 13 and 14. As shown in FIG. 4A and FIG. 4B, the angle formed by the adjacent link mechanisms 11 becomes larger and the pitch P1 between the adjacent link mechanisms 11 becomes larger as the separation distance L1 between the rails 13 and 14 becomes smaller. On the other hand, the angle formed by the adjacent link mechanisms 11 becomes smaller and the pitch P1 between the adjacent link mechanisms 11 becomes smaller as the separation distance L1 between the rails 13 and 14 becomes larger.

As described above, each link mechanism 11 has the clip 21 configured to grip the film 8. Therefore, the pitch P2 between the adjacent clips 21 also increases and decreases in accordance with the increase and decrease of the pitch P1 between the adjacent link mechanisms 11. Specifically, the pitch P1 between the link mechanisms 11 increases when the separation distance L1 between the rails 13 and 14 decreases, and the pitch P2 between the clips 21 also increases when the pitch P1 between the link mechanisms 11 increases (FIG. 4A→FIG. 4B). On the other hand, the pitch P1 between the link mechanisms 11 decreases when the separation distance L1 between the rails 13 and 14 increases, and the pitch P2 between the clips 21 also decreases when the pitch P1 between the link mechanisms 11 decreases (FIG. 4B→FIG. 4A).

Since each of the plurality of link mechanisms 11 includes the clip 21, the pitch P1 between the two adjacent link mechanisms 11 and the pitch P2 between the two clips 21 provided in these link mechanisms 11 are the same. Namely, P1=P2 holds in each of FIG. 4A and FIG. 4B.

<Operation of Stretching Machine>

The film 8 supplied from the raw sheet cooling apparatus 4 to the stretching machine 5 shown in FIG. 1 is held by the link devices 10R and 10L at the inlet of the stretching machine 5. Specifically, the film 8 is gripped by the clips 21 in the link mechanisms 11 of the link devices 10R and 10L shown in FIG. 2 and FIG. 3. More specifically, one side of the film 8 in the width direction is gripped by the clips 21 in the link mechanisms 11 constituting the link device 10R, and the other side of the film 8 in the width direction is gripped by the clips 21 in the link mechanisms 11 constituting the link device 10L.

The film 8 whose both sides in the width direction are gripped by the clips 21 is conveyed from the inlet to the outlet of the stretching machine 5 along with the movement of the link mechanisms 11 including the clips 21, and passes through the preheating region 20A, the stretching region 20B, and the heat setting region 20C in this order. The film 8 is stretched in the MD direction and the TD direction while passing through the stretching region 20B. Thereafter, the film 8 reaches the outlet through the heat setting region 20C and is released from the clips 21. The film 8 released from the clips 21 is conveyed to the take-off apparatus 6 and is further conveyed from the take-off apparatus 6 to the winder apparatus 7.

As shown in FIG. 3, in the preheating region 20A, the interval (separation distance in the TD direction) L2 between the rails 13 and 14 of the link device 10R and the rails 13 and 14 of the link device 10L is almost constant. Therefore, the stretching process of the film 8 in the TD direction is not performed in the preheating region 20A. Accordingly, the width (dimension in the TD direction) of the conveyed film 8 does not change and remains constant in the preheating region 20A.

Also, in the preheating region 20A, the interval (separation distance) L1 between the rail 13 and the rail 14 of the link device 10R on the film side is almost constant. Therefore, in the preheating region 20A, the pitch P1 of the link mechanisms 11 of the link device 10R on the film side is almost constant, and thus the pitch P2 of the clips 21 of the link device 10R on the film side is also almost constant. Further, in the preheating region 20A, the interval (separation distance) L1 between the rail 13 and the rail 14 of the link device 10L on the film side is almost constant. Therefore, in the preheating region 20A, the pitch P1 of the link mechanisms 11 of the link device 10L on the film side is almost constant, and thus the pitch P2 of the clips 21 of the link device 10L on the film side is also almost constant. As a result, the stretching process of the film 8 in the MD direction is not performed in the preheating region 20A. Namely, the stretching process of the film 8 in the TD direction and the MD direction is not performed in the preheating region 20A.

Next, the operation of the stretching machine 5 in the stretching region 20B will be described. In the stretching region 20B, the interval (separation distance in the TD direction) L2 between the rails 13 and 14 of the link device 10R and the rails 13 and 14 of the link device 10L gradually increases as advancing in the conveying direction (MD direction). Therefore, in the stretching region 20B, the film 8 is pulled and stretched in the TD direction as it advances in the conveying direction (MD direction). In other words, in the stretching region 20B, the width (dimension in the TD direction) of the film 8 gradually increases as it advances in the conveying direction (MD direction).

Also, in the stretching region 20B, the interval (separation distance) L1 between the rail 13 and the rail 14 of the link device 10R on the film side gradually decreases and the interval (separation distance) L1 between the rail 13 and the rail 14 of the link device 10L on the film side also gradually decreases as advancing in the conveying direction (MD direction). Therefore, in the stretching region 20B, the pitch P1 of the link mechanisms 11 of the link device 10R on the film side gradually increases as advancing in the conveying direction (MD direction), and thus the pitch P2 of the clips 21 of the link device 10R on the film side also gradually increases. Further, in the stretching region 20B, the pitch P1 of the link mechanisms 11 of the link device 10L on the film side gradually increases as advancing in the conveying direction (MD direction), and thus the pitch P2 of the clips 21 of the link device 10L on the film side also gradually increases. As a result, in the stretching region 20B, the film 8 is pulled and stretched in the MD direction as it advances in the conveying direction (MD direction).

Namely, in the stretching region 20B, the film 8 is stretched in the TD direction and the MD direction as it advances in the conveying direction (MD direction). In other words, in the stretching region 20B, the stretching process in the TD direction and the MD direction is applied to the film 8.

Next, the operation of the stretching machine 5 in the heat setting region 20C will be described. In the heat setting region 20C, the interval (separation distance in the TD direction) L2 between the rails 13 and 14 of the link device 10R and the rails 13 and 14 of the link device 10L is almost constant. Therefore, the stretching process of the film 8 in the TD direction is not performed in the heat setting region 20C. Accordingly, the width (dimension in the TD direction) of the conveyed film 8 does not change and remains constant in the heat setting region 20C.

Further, in the heat setting region 20C, the interval (separation distance) L1 between the rail 13 and the rail 14 of the link device 10R on the film side is almost constant. Therefore, in the heat setting region 20C, the pitch P1 of the link mechanisms 11 of the link device 10R on the film side is almost constant, and thus the pitch P2 of the clips 21 of the link device 10R on the film side is also almost constant. Further, in the heat setting region 20C, the interval (separation distance) L1 between the rail 13 and the rail 14 of the link device 10L on the film side is almost constant. Therefore, in the heat setting region 20C, the pitch P1 of the link mechanisms 11 of the link device 10L on the film side is almost constant, and thus the pitch P2 of the clips 21 of the link device 10L on the film side is also almost constant. As a result, the stretching process of the film 8 in the MD direction is not performed in the heat setting region 20C. Namely, the stretching process of the film 8 in the TD direction and the MD direction is not performed in the heat setting region 20C.

As described above, in the preheating region 20A, the pitch P1 of the link mechanisms 11 of the link device 10R on the film side is kept constant, and the pitch P1 of the link mechanisms 11 of the link device 10L on the film side is also kept constant. Thereafter, in the stretching region 20B, the pitch P1 of the link mechanisms 11 of the link device 10R on the film side and the pitch P1 of the link mechanisms 11 of the link device 10L on the film side are gradually expanded. Then, in the heat setting region 20C, the pitch P1 of the link mechanisms 11 of the link device 10R on the film side is kept constant again, and the pitch P1 of the link mechanisms 11 of the link device 10L on the film side is also kept constant again. Therefore, on the film side of each of the link devices 10R and 10L, the pitch P1 of the link mechanisms 11 in the heat setting region 20C is larger than the pitch P1 of the link mechanisms 11 in the preheating region 20A. From another viewpoint, on the film side of each of the link devices 10R and 10L, the pitch P2 of the clips 21 in the heat setting region 20C is larger than the pitch P2 of the clips 21 in the preheating region 20A. From still another viewpoint, on the film side of each of the link devices 10R and 10L, the separation distance L1 between the rails 13 and 14 in the heat setting region 20C is smaller than the separation distance L1 between the rails 13 and 14 in the preheating region 20A.

<Configuration of Link Mechanism>

Figure 5:
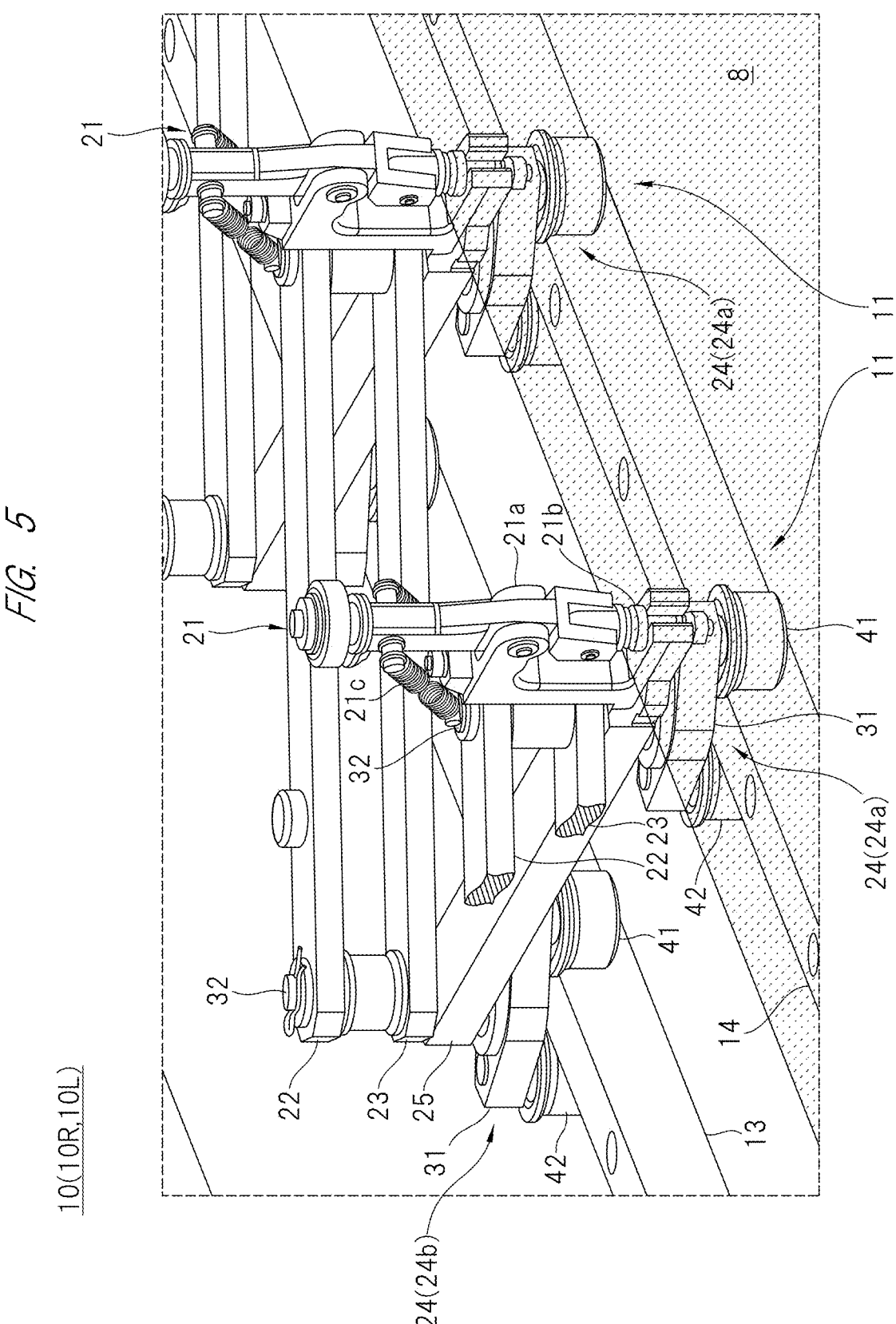
FIG. 5 is a perspective view showing some link mechanisms in an enlarged manner.
Figure 6:
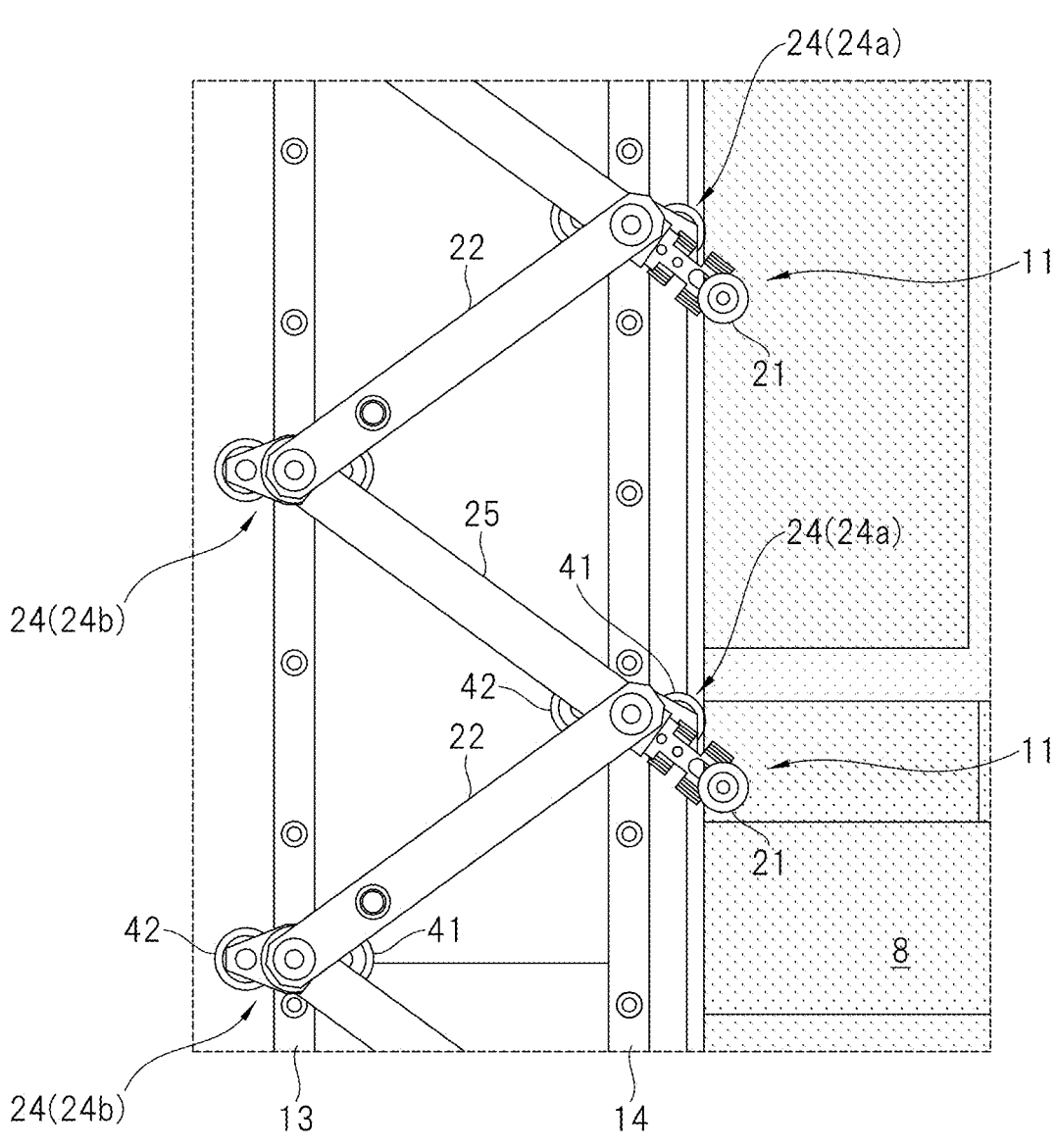
FIG. 6 is a plan view showing some link mechanisms in an enlarged manner.

FIG. 5 is a perspective view showing some link mechanisms 11 constituting the link device 10 in an enlarged manner. FIG. 6 is a plan view showing some link mechanisms 11 constituting the link device 10 in an enlarged manner.

As shown in FIG. 5 and FIG. 6, each of the link mechanisms 11 in the link devices 10R and 10L includes an upper link plate 22 and a lower link plate 23 in addition to the clip 21. Each of the link mechanisms 11 further includes an outer rail holder 24a, an inner rail holder 24b, and a base member 25 bridging the outer rail holder 24a and the inner rail holder 24b.

The outer rail holder 24a is disposed on the rail 14 and moves (runs) along the rail 14. The inner rail holder 24b is disposed on the rail 13 disposed on the inner side of the rail 14 and moves (runs) along the rail 13.

The upper link plate 22 and the lower link plate 23 are plate-shaped members that extend linearly in plan view. The base member 25 is common with the upper link plate 22 and the lower link plate 23 in that the base member 25 extends linearly in plan view. Understandably, the base member 25 is thicker than the upper link plate 22 and the lower link plate 23.

In the following description, the outer rail holder 24a and the inner rail holder 24b are collectively referred to as "rail holders 24" when there is no particular need for distinction therebetween.

<Rail Holder>

The rail holder 24 includes a roller holding portion 31 and a shaft 32 provided at the center of the roller holding portion 31 in the longitudinal direction. The roller holding portion 31 of the outer rail holder 24a is disposed on the rail 14 so as to straddle the rail 14. Therefore, one end of the roller holding portion 31 disposed on the rail 14 in the longitudinal direction protrudes toward the outer side of the rail 14, and the other end of the roller holding portion 31 in the longitudinal direction protrudes toward the inner side of the rail 14 (side facing the rail 13). Also, when the roller holding portion 31 of the outer rail holder 24a is disposed on the rail 14, the shaft 32 is located just above the rail 14.

On the other hand, the roller holding portion 31 of the inner rail holder 24b is disposed on the rail 13 so as to straddle the rail 13. Therefore, one end of the roller holding portion 31 disposed on the rail 13 in the longitudinal direction protrudes toward the outer side of the rail 13 (side facing the rail 14), and the other end of the roller holding portion 31 in the longitudinal direction protrudes toward the inner side of the rail 13. Also, when the roller holding portion 31 of the inner rail holder 24*b* is disposed on the rail 13, the shaft 32 is located just above the rail 13.

The shaft 32 of the outer rail holder 24*a* penetrates one ends (base ends) of the upper link plate 22, the lower link plate 23, and the base member 25 in the longitudinal direction. As a result, the base ends of the upper link plate 22, the lower link plate 23, and the base member 25 are rotatably coupled with each other by the shaft 32 of the outer rail holder 24*a*.

On the other hand, the shaft 32 of the inner rail holder 24*b* penetrates the other end (tip end) of the base member 25 in the longitudinal direction and protrudes from the base member 25. The shaft 32 of the inner rail holder 24*b* protruding from the base member 25 penetrates one ends (tip ends) of the upper link plate 22 and the lower link plate 23 of another adjacent link mechanism 11 in the longitudinal direction. As a result, the tip end of the base member 25 of the link mechanism 11 and the tip ends of the upper link plate 22 and the lower link plate 23 of another adjacent link mechanism 11 are rotatably coupled with each other by the shaft 32 of the inner rail holder 24*b*.

From another viewpoint, the shaft 32 of the outer rail holder 24*a* is a rotating axis on the base end side of the upper link plate 22, the lower link plate 23, and the base member 25, and the shaft 32 of the inner rail holder 24*b* is a rotating axis on tip end side of the upper link plate 22, the lower link plate 23, and the base member 25. From still another viewpoint, the base ends of the upper link plate 22, the lower link plate 23, and the base member 25 are rotatably supported by the outer rail holder 24*a*, and the tip ends of the upper link plate 22, the lower link plate 23, and the base member 25 are rotatably supported by the inner rail holder 24*b*.

<Clip>

The clip 21 is provided at the base end of the base member 25 of each link mechanism 11. The clip 21 includes a main body portion 21*a*, a grip portion 21*b*, a spring portion 21*c*, and others. The main body portion 21*a* is fixed to the base end of the base member 25. The grip portion 21*b* is attached to the main body portion 21*a* so as to be operable in an up-down direction. The spring portion 21*c* biases the grip portion 21*b* so as to operate the grip portion 21*b* downward. By making the grip portion 21*b* operate downward by the biasing force of the spring portion 21*c*, the film 8 is sandwiched between the main body portion 21*a* and the grip portion 21*b*. Namely, the film 8 is gripped by the clip 21. On the other hand, by making the grip portion 21*b* operate upward against the biasing force of the spring portion 21*c*, the film 8 is released from the clip 21.

<Guide Roller>

The rail holder 24 has a plurality of guide rollers moving along the rails 13 and 14. More specifically, a pair of guide rollers 41 and 42 facing each other with the rail 14 interposed therebetween are provided in a lower portion of the outer rail holder 24*a*. Similarly, a pair of guide rollers 41 and 42 facing each other with the rail 13 interposed therebetween are provided in a lower portion of the inner rail holder 24*b*. Each of the guide rollers 41 and 42 has a cylindrical shape with openings at both ends in the axial direction, and a flange is integrally formed at an upper end thereof.

The guide roller 41 of the outer rail holder 24*a* is disposed on the outer side of the rail 14, and the flange thereof overlaps an outer edge of an upper surface of the rail 14. The guide roller 42 of the outer rail holder 24*a* is disposed on the inner side of the rail 14, and the flange thereof overlaps an inner edge of the upper surface of the rail 14.

The guide roller 41 of the inner rail holder 24*b* is disposed on the outer side of the rail 13, and the flange thereof overlaps an outer edge of an upper surface of the rail 13. The guide roller 42 of the inner rail holder 24*b* is disposed on the inner side of the rail 13, and the flange thereof overlaps an inner edge of the upper surface of the rail 13.

Therefore, the guide roller 41 of the outer rail holder 24*a* moves on the outer side of the rail 14 while being in contact with the rail 14, and the guide roller 42 of the outer rail holder 24*a* moves on the inner side of the rail 14 while being in contact with the rail 14. Further, the guide roller 41 of the inner rail holder 24*b* moves on the outer side of the rail 13 while being in contact with the rail 13, and the guide roller 42 of the inner rail holder 24*b* moves on the inner side of the rail 14 while being in contact with the rail 13.

Also, the entire link mechanism 11 is supported by the rails 13 and 14 via the guide rollers 41 and 42 provided in the outer rail holder 24*a* and the guide rollers 41 and 42 provided in the inner rail holder 24*b*.

In other words, the guide rollers 41 and 42 provided in the outer rail holder 24*a* and the guide rollers 41 and 42 provided in the inner rail holder 24*b* are support rollers that support the link mechanism 11.

The roller holding portion 31 of each rail holder 24 is attached to the lower end of the shaft 32 protruding downward from the base member 25 so as to be rotatable about the shaft 32 as a rotating axis. More specifically, the roller holding portion 31 is attached to the lower end of the shaft 32 via bearings.

As described above, the roller holding portion 31 of the outer rail holder 24*a* protrudes toward both sides of the rail 14 while straddling the rail 14. On the other hand, the roller holding portion 31 of the inner rail holder 24*b* protrudes toward both sides of the rail 13 while straddling the rail 13.

A shaft (roller shaft) is provided at one end of the roller holding portion 31 of the outer rail holder 24*a* protruding toward the outer side of the rail 14. Also, another shaft (another roller shaft) is provided at the other end of the roller holding portion 31 of the outer rail holder 24*a* protruding toward the inner side of the rail 14. An upper portion of each roller shaft is press-fitted into a mounting hole provided in the roller holding portion 31.

Similarly, a shaft (roller shaft) is provided at one end of the roller holding portion 31 of the inner rail holder 24*b* protruding toward the outer side of the rail 13. Also, another shaft (another roller shaft) is provided at the other end of the roller holding portion 31 of the inner rail holder 24*b* protruding toward the inner side of the rail 13. An upper portion of each roller shaft is press-fitted into a mounting hole provided in the roller holding portion 31.

The guide roller 41 of the outer rail holder 24*a* is rotatably attached to the lower portion of the roller shaft protruding toward the lower side from one side of the roller holding portion 31. Also, the guide roller 42 of the outer rail holder 24*a* is rotatably attached to the lower portion of the other roller shaft protruding toward the lower side from the other side of the roller holding portion 31. Namely, the guide rollers 41 and 42 of the outer rail holder 24*a* are rotatably held by the roller holding portion 31. More specifically, the guide rollers 41 and 42 are rotatably attached to the roller shafts fixed to the roller holding portion 31 via bearings.

Similarly, the guide roller 41 of the inner rail holder 24*b* is rotatably attached to the lower portion of the roller shaft protruding toward the lower side from one side of the roller holding portion 31. Also, the guide roller 42 of the inner rail holder 24*b* is rotatably attached to the lower portion of the other roller shaft protruding toward the lower side from the other side of the roller holding portion 31. Namely, the guide rollers 41 and 42 of the inner rail holder 24*b* are rotatably held by the roller holding portion 31. More specifically, the guide rollers 41 and 42 are rotatably attached to the roller shafts fixed to the roller holding portion 31 via bearings.

<Roller Cover>

As described above, the space between the link devices 10R and 10L facing each other is used as the conveyance path of the film 8 (see FIG. 3). The film 8 moves on the conveyance path in the MD direction while being gripped by the clips 21 in the plurality of link mechanisms 11 constituting the link devices 10R and 10L. Each of the clips 21 is provided at one end (base end) of the base member 25 in the longitudinal direction where the outer rail holder 24*a* moving along the rail 14 is provided.

As a result, the film 8 conveyed by the link devices 10R and 10L passes near the rail 14 along the rail 14 (see FIG. 5 and FIG. 6). At this time, the guide rollers 41 and 42 of the outer rail holder 24*a* move on the rail 14 while rotating in contact with the rail 14. Also, the guide rollers 41 and 42 of the inner rail holder 24*b* move on the rail 13 while rotating in contact with the rail 13. Therefore, the rails 13 and 14 wear due to the contacts with the guide rollers 41 and 42. Then, when the flatness of the rails 13 and 14 decreases due to wear, vibrations occur.

Therefore, in order to reduce the wear of the rails 13 and 14, lubricating oil is supplied to the rails 13 and 14. More specifically, a plurality of oil supply ports to which oil supply pipes are connected are provided in the lower surfaces of the rails 13 and 14. Further, vertical through holes that vertically penetrate the rails 13 and 14 are formed inside the rails 13 and 14. One ends of the vertical through holes communicate with the oil supply ports, and the other ends open to the upper surfaces of the rails 13 and 14.

The lubricating oil supplied to the oil supply ports flows out from the openings of the vertical through holes (upper oil supply holes) to the upper surfaces of the rails 13 and 14, and spreads over the upper surfaces and both side surfaces of the rails 13 and 14. In other words, oil films are formed on the surfaces of the rails 13 and 14.

By forming the oil films on the surfaces of the rails 13 and 14, wear of the rails 13 and 14 is reduced. However, when the guide rollers 41 and 42 move on the rails 13 and 14 while rotating, there is a fear that the lubricating oil adhering to the guide rollers 41 and 42 may be scattered around. Furthermore, there is also a fear that the scattered lubricating oil may adhere to the film 8. The possibility that the lubricating oil will scatter and adhere to the film 8 increases as the moving speed (traveling speed) of the link mechanism 11 increases.

In addition, the film 8 passes near the rail 14. Therefore, the lubricating oil scattered by the guide rollers 41 and 42 of the outer rail holder 24*a* moving along the rail 14 is more likely to adhere to the film 8 than the lubricating oil scattered by the guide rollers 41 and 42 of the inner rail holder 24*b* moving along the rail 13.

Furthermore, the guide roller 41 of the outer rail holder 24*a* moving on the outer side of the rail 14 is closer to the film 8 than the guide roller 42 of the outer rail holder 24*a* moving on the inner side of the rail 14 is. In other words, the lubricating oil scattered by the guide roller 41 of the outer rail holder 24*a* is most likely to adhere to the film 8.

Figure 7:
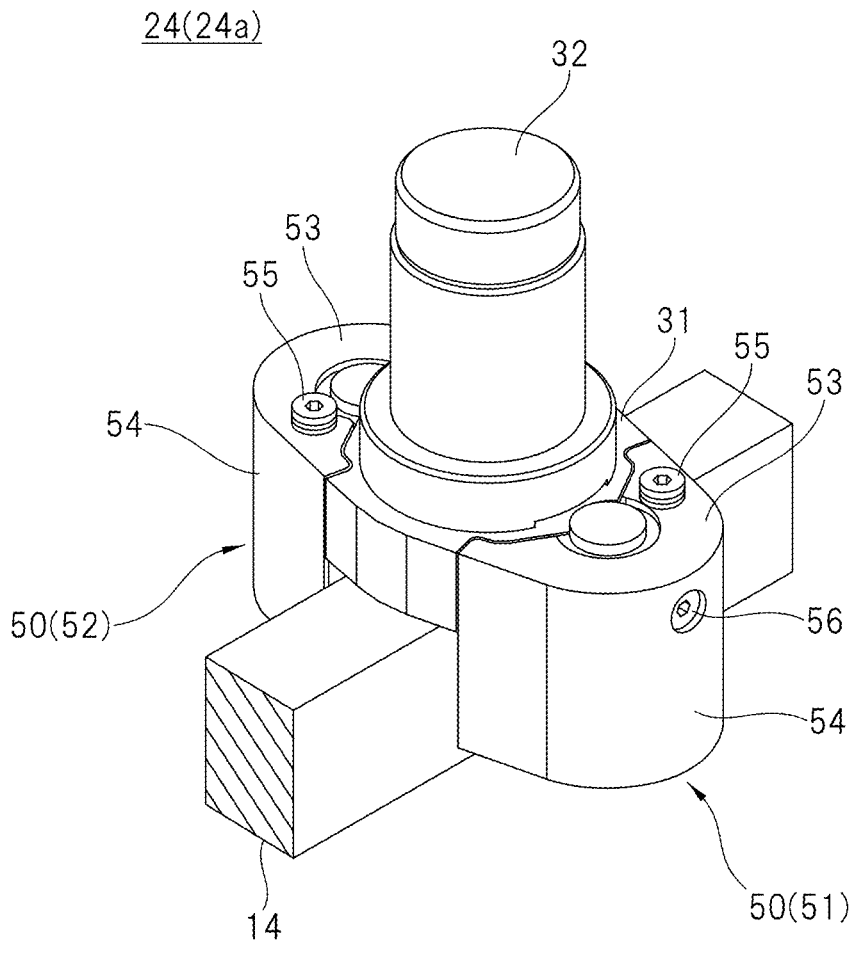
FIG. 7 is an enlarged perspective view of an outer rail holder.
Figure 8A:
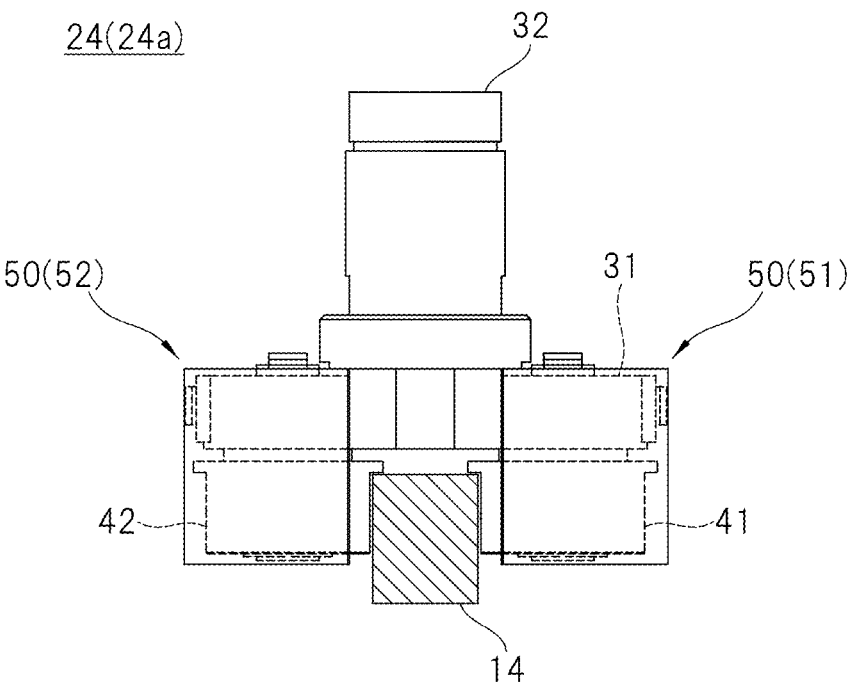
FIG. 8A is an explanatory diagram showing a roller cover provided on the outer rail holder.
Figure 8B:
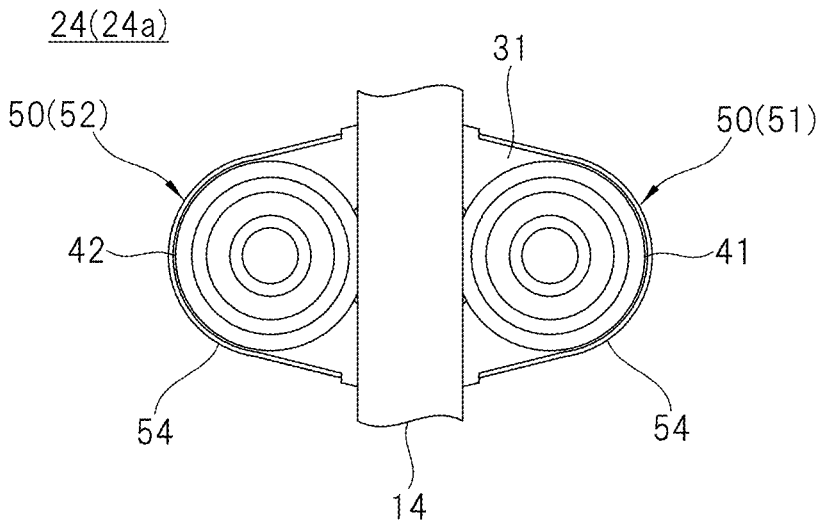
FIG. 8B is a bottom view showing the roller cover provided on the outer rail holder.

Therefore, a cover capable of preventing the lubricating oil from scattering around is provided on the outer rail holder 24*a* in the present embodiment. FIG. 7 is an enlarged perspective view of the outer rail holder 24*a*. FIG. 8A is an explanatory diagram showing the cover provided on the outer rail holder 24*a*. FIG. 8B is a bottom view showing the cover provided on the outer rail holder 24*a*. Note that illustrations of the cover provided on the outer rail holder 24*a* are omitted in FIG. 5 and FIG. 6.

The outer rail holder 24*a* includes a roller cover 50 configured to cover at least one of the plurality of guide rollers 41 and 42 moving along the rail 14. The roller cover 50 is composed of a cover member 51 configured to cover the guide roller 41 moving on the outer side of the rail 14 and a cover member 52 configured to cover the guide roller 42 moving on the inner side of the rail 14. Namely, the roller cover 50 of the present embodiment individually covers both of the guide rollers 41 and 42 in the outer rail holder 24*a*.

Each of the cover members 51 and 52 includes an upper surface portion 53 covering the roller holding portion 31 and a side surface portion 54 covering an outer peripheral surface of the guide rollers 41 and 42. Understandably, the upper surface portion 53 and the side surface portion 54 are integrally formed of a resin.

The side surface portions 54 of the cover members 51 and 52 are curved so as to follow the outer peripheral surfaces of the guide rollers 41 and 42, and cover most part of the outer peripheral surfaces of the guide roller 41 and 42. More specifically, the side surface portion 54 of the cover member 51 covers at least half of the outer peripheral surface of the guide roller 41 in a circumferential direction. Also, the side surface portion 54 of the cover member 52 covers at least half of the outer peripheral surface of the guide roller 42 in a circumferential direction.

The cover member 51 and the cover member 52 are attached to both sides of the roller holding portion 31, respectively. More specifically, the upper surface portions 53 of the cover members 51 and 52 are fixed to the upper surface of the roller holding portion 31 by screws 55. Further, the side surface portions 54 of the cover members 51 and 52 are fixed to the side surfaces of the roller holding portion 31 by screws 56.

Namely, the roller cover 50 is removably attached to the roller holding portion 31. More specifically, the cover member 51 and the cover member 52 are removably attached to the roller holding portion 31 independently of each other. From another viewpoint, it is also possible to attach only one of the cover member 51 and the cover member 52 to the roller holding portion 31. When attaching only one the cover member 51 and the cover member 52, it is preferable to attach the cover member 51 from the viewpoint of preventing lubricating oil from adhering to the film 8.

The cover member 51 and the cover member 52 attached to both sides of the roller holding portion 31 face each other with the shaft 32 interposed therebetween. From another viewpoint, when the outer rail holder 24*a* is disposed on the rail 14, the cover member 51 and the cover member 52 face each other with the rail 14 interposed therebetween.

In order to smoothly move the outer rail holder 24*a*, it is necessary to provide a clearance between the roller cover 50 and the rail 14. However, if the clearance between the roller cover 50 and the rail 14 is wide, there is a fear that the lubricating oil may be scattered around through the gap. Therefore, it is preferable to make the clearance between the roller cover 50 and the rail 14 as narrow as possible within the range where the roller cover 50 does not interfere with the rail 14. Note that the clearance between the roller cover 50 and the rail 14 can be adjusted by increasing or decreasing the facing distance between the cover member 51 and the cover member 52. Further, the facing distance between the cover member 51 and the cover member 52 can be increased or decreased by changing their shapes, sizes, attachment positions, and the like.

Figure 9:
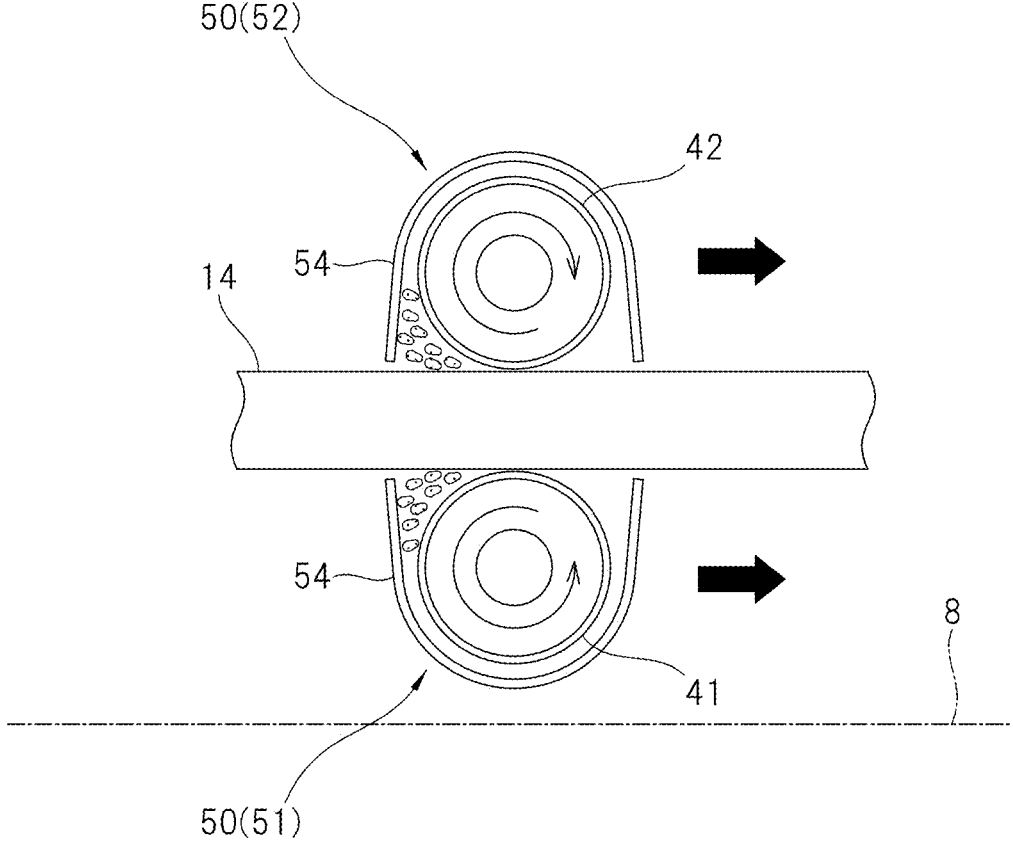
FIG. 9 is an explanatory diagram showing a function of the roller cover provided on the outer rail holder.

FIG. 9 is an explanatory diagram showing a function of the roller cover 50. The lubricating oil moved from the rail 14 to the guide rollers 41 and 42 is separated from the guide rollers 41 and 42 by the rotation of the guide rollers 41 and 42. The lubricating oil separated from the guide rollers 41 and 42 adheres to the roller cover 50 covering the guide rollers 41 and 42. More specifically, the lubricating oil hits the inner peripheral surface of the roller cover 50 facing the outer peripheral surfaces of the guide rollers 41 and 42 and adheres to the inner peripheral surface. As a result, it is possible to prevent the lubricating oil from scattering around, and also prevent the lubricating oil from adhering to the film 8.

From another viewpoint, it is possible to supply a sufficient amount of lubricating oil to the rails 13 and 14 without worrying about the lubricating oil adhering to the film 8. Namely, it is possible to reduce the wear of the rails 13 and 14 of the link devices 10R and 10L and prevent the occurrence of vibrations.

In the present embodiment, the roller cover 50 is provided on the outer rail holder 24a which is closer to the film 8 than the inner rail holder 24b is. However, it is also possible to provide the roller cover 50 not only on the outer rail holder 24a but also on the inner rail holder 24b. More specifically, the roller cover 50 may be provided on the inner rail holder 24b so as to cover at least one of the plurality of guide rollers 41 and 42 in the inner rail holder 24b. By providing the roller cover 50 on both of the outer rail holder 24a and the inner rail holder 24b, it is possible to more reliably prevent the lubricating oil from scattering around and also prevent the lubricating oil from adhering to the film 8.

The roller cover 50 of the present embodiment is composed of two independent members (cover members 51 and 52). Therefore, it is also possible to selectively attach either of the cover member 51 or the cover member 52 to the outer rail holder 24a and the inner rail holder 24b. For example, it is possible to attach only the cover member 51 to the outer rail holder 24a. Further, it is also possible to attach the cover member 51 and the cover member 52 to the outer rail holder 24a and attach only the cover member 51 to the inner rail holder 24b. In this case, the three guide rollers (the guide rollers 41 and 42 of the outer rail holder 24a and the guide roller 41 of the inner rail holder 24b) are covered with the roller covers 50.

Note that the following can be understood from FIG. 5 and FIG. 6. The guide roller 41 of the outer rail holder 24a is the guide roller closest to the film 8 among the four guide rollers in one link mechanism 11. Also, the guide roller 42 of the outer rail holder 24a is the guide roller second closest to the film 8 among the four guide rollers in one link mechanism 11.

Further, the guide roller 41 of the inner rail holder 24b is the guide roller third closest to the film 8 among the four guide rollers in one link mechanism 11. In addition, the guide roller 42 of the inner rail holder 24b is the guide roller farthest from the film 8 among the four guide rollers in one link mechanism 11.

<Modification of Roller Cover>

Figure 10:
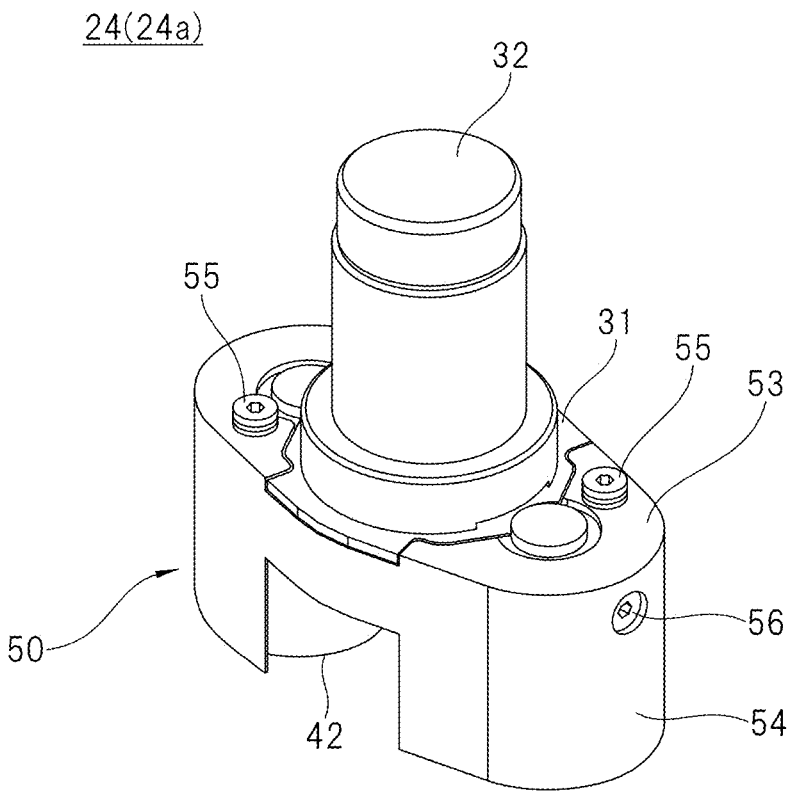
FIG. 10 is a perspective view showing a modification of the roller cover provided on the outer rail holder.

FIG. 10 is a perspective view showing a modification of the roller cover 50. The roller cover 50 of the outer rail holder 24a shown in FIG. 10 collectively covers both of the guide rollers 41 and 42 of the outer rail holder 24a.

As described above, the guide roller 41 of the outer rail holder 24a moves on the outer side of the rail 14, and the guide roller 42 of the outer rail holder 24a moves on the inner side of the rail 14. Namely, the roller cover 50 shown in FIG. 10 collectively covers the guide roller 41 moving on the outer side of the rail 14 and the guide roller 42 moving on the inner side of the rail 14.

From another viewpoint, in the roller cover 50 shown in FIG. 10, the cover member 51 and the cover member 52 shown in FIG. 7 are integrally connected.

The roller cover 50 shown in FIG. 10 is fixed to the roller holding portion 31 by screws 55 and 56 like the roller cover 50 shown in FIG. 7. Namely, the roller cover 50 shown in FIG. 10 is removably attached to the roller holding portion 31. Note that the roller cover 50 shown in FIG. 10 can also be attached to the roller holding portion 31 of the inner rail holder 24b shown in FIG. 5 and FIG. 6.

<Modification of Link Device>

Figure 11:
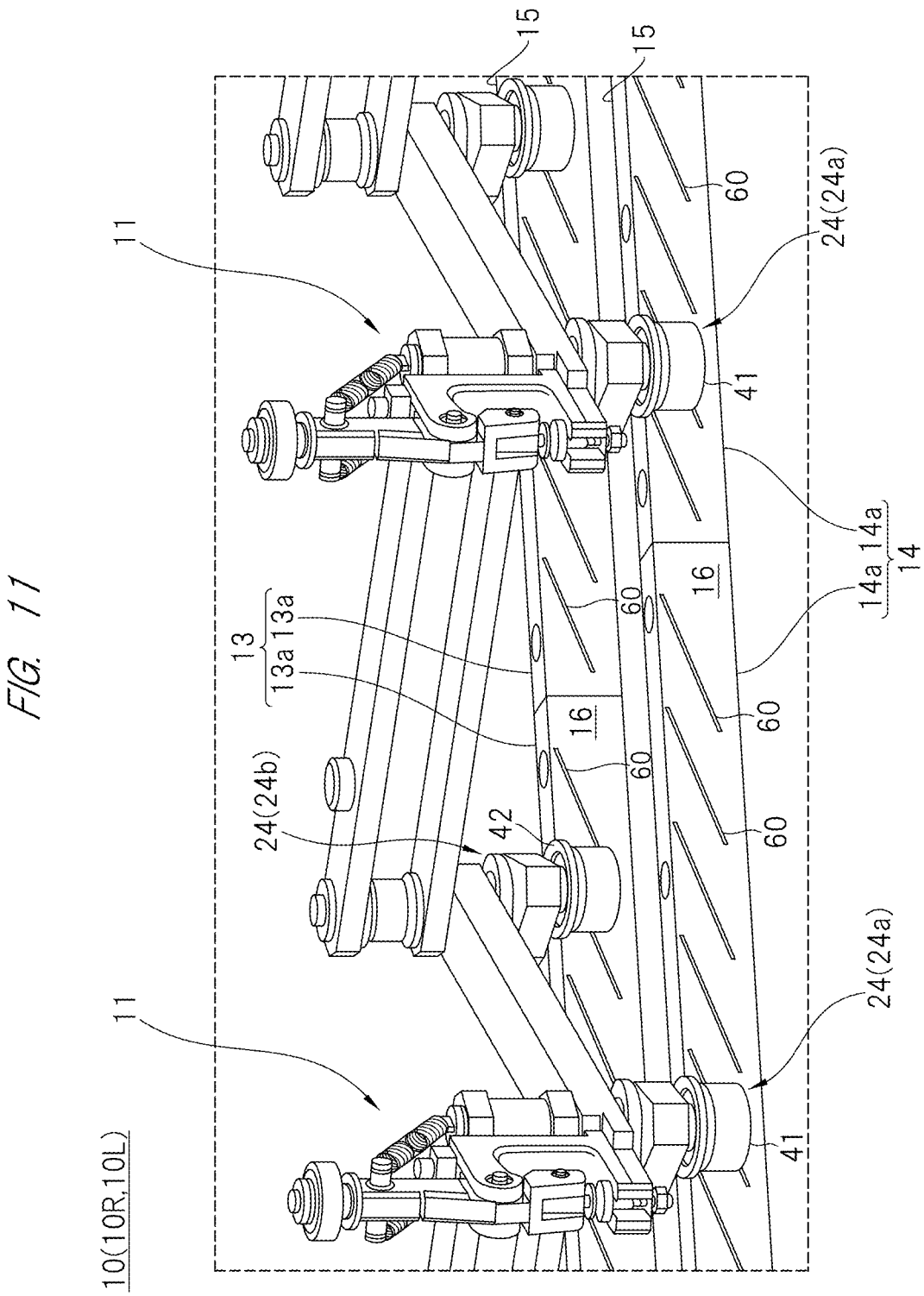
FIG. 11 is a perspective view showing a modification of a link device.

FIG. 11 is a perspective view showing a modification of the link device 10. Understandably, the link device 10 shown in FIG. 11 has the same basic structure as the link device 10 described above. Therefore, the link device 10 shown in FIG. 11 can be replaced with the link device 10 described above and constitute the stretching machine 5 described above.

Therefore, description of the same or substantially the same configuration as the link device 10 described above will be omitted, and only the differences will be described.

A plurality of grooves 60 capable of retaining lubricating oil are formed in the rails 13 and 14 of the link device 10 shown in FIG. 11. More specifically, a plurality of grooves 60 are formed in an inner side surface 15 and an outer side surface 16 of each of the rails 13 and 14.

Understandably, the grooves 60 are not formed in the entire section of the rails 13 and 14, but are formed only in a part of the section. More specifically, the grooves 60 are formed only in the sections of the rails 13 and 14 in the heat setting region 20C.

The rail 13 is formed of a plurality of partial rails 13a coupled annularly. The grooves 60 are formed in the inner side surface 15 and the outer side surface 16 of the partial rails 13a disposed in the heat setting region 20C (FIG. 3) of the stretching machine 5. Similarly, the rail 14 is formed of a plurality of partial rails 14a coupled annularly. The grooves 60 are formed in the inner side surface 15 and the outer side surface 16 of the partial rails 14a disposed in the heat setting region 20C (FIG. 3) of the stretching machine 5.

Figure 12A:
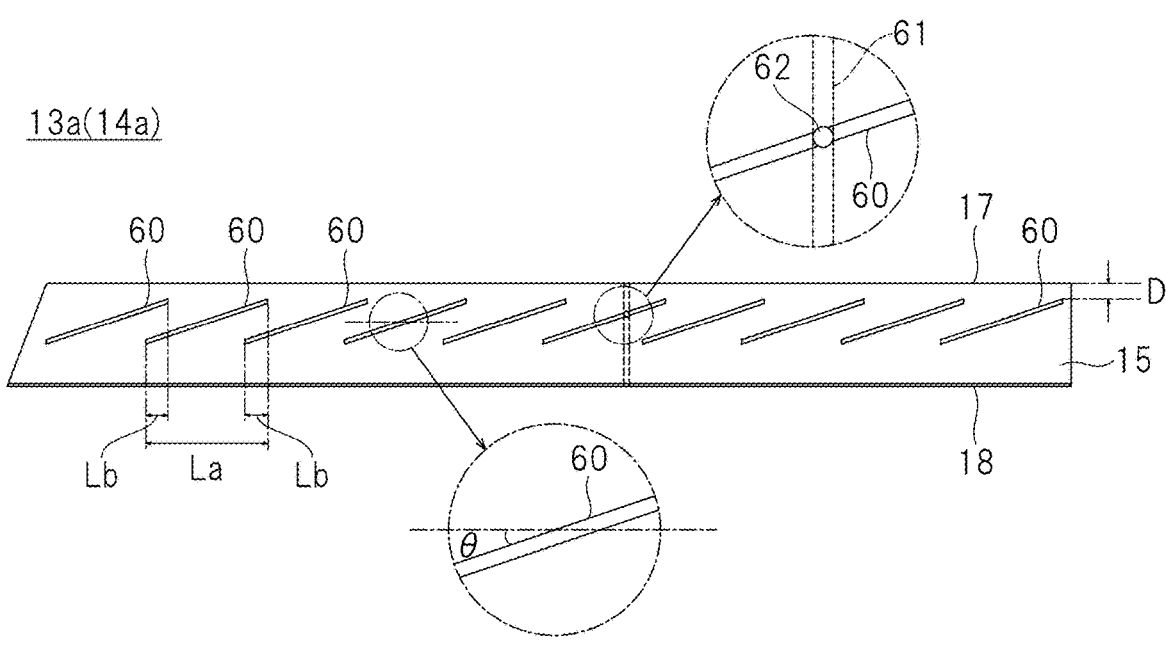
FIG. 12A is a side view showing an inner side surface of a partial rail disposed in a heat setting region of the stretching machine.
Figure 12B:
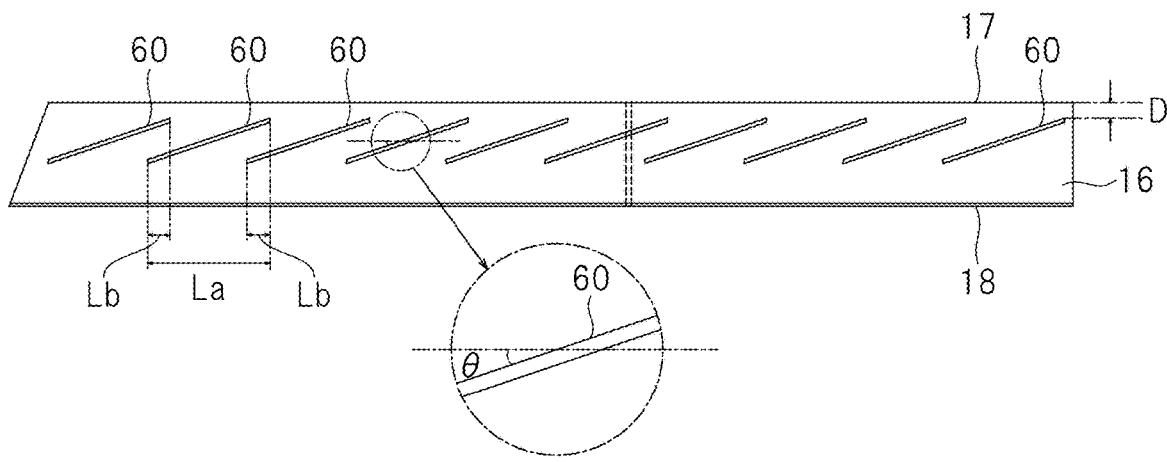
FIG. 12B is a side view showing an outer side surface of the partial rail shown in FIG. 12A.

FIG. 12A is a side view showing the inner side surface 15 of the partial rails 13a and 14a disposed in the heat setting region 20C. FIG. 12B is a side view showing the outer side surface 16 of the partial rails 13a and 14a shown in FIG. 12A.

The respective grooves 60 formed in the inner side surface 15 and the outer side surface 16 of the partial rails 13a and 14a are inclined with respect to the longitudinal direction of the rails 13 and 14 (partial rails 13a and 14a), and are parallel to each other.

More specifically, the respective grooves 60 are inclined with respect to a virtual line (reference line) parallel to an upper surface 17 and a lower surface 18 of the rails 13 and 14 (partial rails 13a and 14a) at an inclined angle θ (θ=2°).

Furthermore, a forward end (upper end) of one groove 60 and a back end (lower end) of another groove 60 adjacent to the groove 60 in the longitudinal direction of the rails 13 and 14 (partial rails 13a and 14a) overlap vertically. As a result, the forward end (upper end) of the groove 60 is located above the back end (lower end) of the adjacent groove 60, and the back end of the groove 60 is located below the forward end (upper end) of the adjacent groove 60.

Note that a total length La of each groove 60 is 55.0 mm, and an overlapping length Lb between adjacent grooves 60 is 10.0 mm. Further, a distance D from the forward end (upper end) of each groove 60 to the upper surface 17 of the rails 13 and 14 (partial rails 13*a* and 14*a*) is 2.0 mm.

Horizontal through holes 62 that communicate vertical through holes 61 formed inside the partial rails 13*a* and 14*a* and the grooves 60 are provided in the inner side surfaces 15 and the outer side surfaces 16 of the partial rails 13*a* and 14*a*. One end of the horizontal through hole 62 communicates with the vertical through hole 61, and the other end opens to the bottom surface of the groove 60.

Therefore, a part of the lubricating oil supplied to the above-mentioned oil supply port flows out from the openings (upper oil supply holes) of the vertical through holes 61 to the upper surfaces 17 of the rails 13 and 14 (partial rails 13*a* and 14*a*), and spreads over the upper surfaces 17, the inner side surfaces 15, and the outer side surfaces 16 of the rails 13 and 14. Further, another part of the lubricating oil supplied to the oil supply port flows out from the openings (side oil supply holes) of the horizontal through holes 62 to the grooves 60 through the vertical through holes 61 and the horizontal through holes 62. Thereafter, the lubricating oil that has flowed into the grooves 60 spreads to the inner side surfaces 15 and the outer side surfaces 16 of the rails 13 and 14.

The lubricating oil that has spread on the inner side surfaces 15 and the outer side surfaces 16 of the rails 13 and 14 as described above is spread (extended) in the longitudinal direction of the rails 13 and 14 by the guide rollers 41 and 42 that move while being in contact with the rails 13 and 14. In other words, an oil film is formed on the surfaces of the rails 13 and 14.

Furthermore, a part of the lubricating oil that has spread to the inner side surfaces 15 and the outer side surfaces 16 of the rails 13 and 14 is retained in the grooves 60. From another viewpoint, the lubricating oil remains on the surfaces of the rails 13 and 14 for a long period of time. As a result, an oil film is continuously formed on the surfaces of the rails 13 and 14 for a long period of time. Note that, since the grooves 60 overlap vertically, the lubricating oil dripping down the side surfaces of the rails 13 and 14 is effectively captured and retained.

As described above, the interval (separation distance in the TD direction) L2 between the rails 13 and 14 of the link device 10R and the rails 13 and 14 of the link device 10L is maximum in the heat setting region 20C of the stretching machine 5. Therefore, the force that the rails 13 and 14 receive from the guide rollers 41 and 42 is maximum in the section of the heat setting region 20C. From another viewpoint, the partial rails 13*a* and 14*a* disposed in the heat setting region 20C are more likely to wear than the partial rails 13*a* and 14*a* disposed in the other regions.

Therefore, in the present embodiment, the grooves 60 are formed in the side surfaces of the partial rails 13*a* and 14*a* that form a part of the section (section of heat setting region) of the rails 13 and 14, thereby improving the oil film retention performance in this section. As a result, wear of the rails 13 and 14 is effectively reduced and the occurrence of vibrations is prevented.

More lubricating oil can be retained in the grooves 60 as the grooves 60 become deeper. However, if the grooves 60 become too deep, it becomes difficult for the lubricating oil to spread. Further, oil scum and the like tend to accumulate in the grooves 60. Therefore, the depth of the groove 60 is preferably 0.5 mm or less.

Figure 13A:
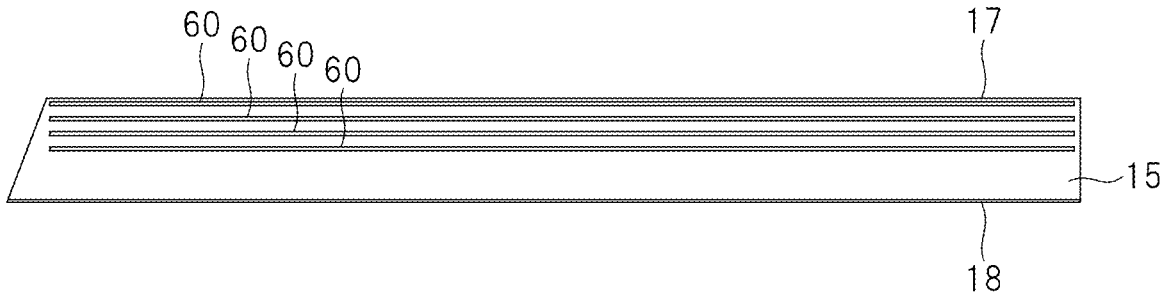
FIG. 13A is a side view showing a modification of grooves formed in a side surface of a rail.
Figure 13B:
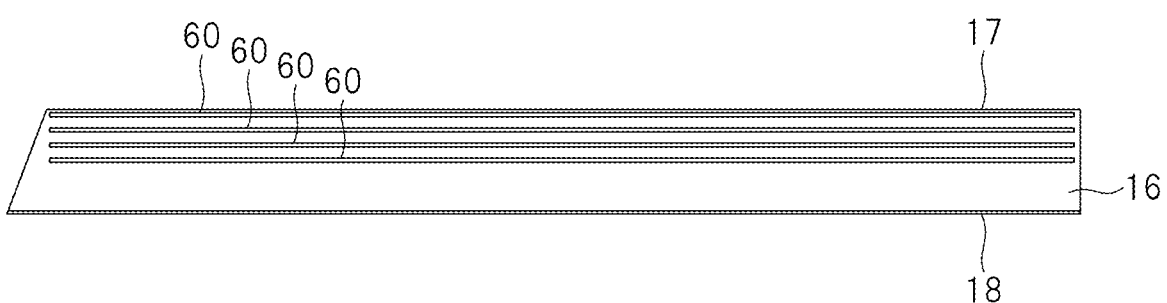
FIG. 13B is another side view showing the modification of the grooves formed in the side surface of the rail.

The inclined angle θ of the grooves 60 formed in the side surfaces of the rails 13 and 14 is not limited to 2°. FIG. 13A and FIG. 13B are side views showing a modification of the grooves 60 formed in the side surfaces of the rails 13 and 14. The inclined angle θ of the grooves 60 formed in the inner side surface 15 of the partial rails 13*a* and 14*a* shown in FIG. 13A is 0°. From another viewpoint, the grooves 60 shown in FIG. 13A are parallel to the longitudinal direction of the rails 13 and 14 and parallel to each other. Moreover, the adjacent grooves 60 overlap vertically in full length.

Similarly, the inclined angle θ of the grooves 60 formed in the outer side surface 16 of the partial rails 13*a* and 14*a* shown in FIG. 13B is 0°. From another viewpoint, the grooves 60 shown in FIG. 13B are parallel to the longitudinal direction of the rails 13 and 14 and parallel to each other. Moreover, the adjacent grooves 60 overlap vertically in full length.

Although the rail holder 24 shown in FIG. 11 is not provided with the roller cover 50, the roller cover 50 may be provided.

In the foregoing, the invention made by the inventors of this application has been specifically described based on the embodiment and example. However, it is needless to say that the present invention is not limited to the embodiment or example described above and various modifications can be made within the range not departing from the gist of the present invention.

For example, the guide rollers 41 and 42 in each link mechanism 11 are not limited to rollers with flanges (flanged rollers).

The grooves 60 may be formed in the entire section of the rails 13 and 14, or may be formed in a part of the section other than the section of the heat setting region. The number and position of the vertical through holes 61 and the horizontal through holes 62 can be changed as appropriate. Moreover, the horizontal through hole 62 may be opened in the side surfaces of the rails 13 and 14 instead of the bottom surfaces of the grooves 60. Namely, the side oil supply holes may be provided in the inner side surfaces 15 and the outer side surfaces 16 of the rails 13 and 14 instead of the bottom surfaces of the grooves 60.

REFERENCE SIGNS LIST 1 thin-film manufacturing system
2 extrusion apparatus
3 T-die
4 raw sheet cooling apparatus
5 stretching machine
6 take-off apparatus
7 winder apparatus
8 film
9 heat treatment unit
10, 10R, 10L link device
11 link mechanism
13, 14 rail
13*a*, 14*a* partial rail
15 inner side surface
16 outer side surface
17 upper surface
18 lower surface
19*a*, 19*b*, 19*c* sprocket
20A preheating region
20B stretching region
20C heat setting region
21 clip
21*a* main body portion 21*b* grip portion
21*c* spring portion
22 upper link plate
23 lower link plate
24 rail holder
24*a* outer rail holder
24*b* inner rail holder
25 base member
31 roller holding portion
32 shaft
41, 42 guide roller
50 roller cover
51, 52 cover member
53 upper surface portion
54 side surface portion
55, 56 screw
60 groove
61 vertical through hole
62 horizontal through hole
L1, L2 separation distance
La total length
Lb overlapping length
P1, P2 pitch

The invention claimed is:

1. A link mechanism constituting a link device used in a stretching machine configured to stretch a film, the link mechanism comprising:

a base member;

an outer rail holder provided on one end side of the base member in a longitudinal direction and including a plurality of guide rollers moving along a first rail;

an inner rail holder provided on the other end side of the base member in the longitudinal direction and including a plurality of guide rollers moving along a second rail provided on an inner side of the first rail;

a link plate having one end in a longitudinal direction rotatably coupled to the outer rail holder and the other end in the longitudinal direction rotatably coupled to another link mechanism; and a clip provided on the one end side of the base member in the longitudinal direction where the outer rail holder is provided and configured to grip the film, wherein the plurality of guide rollers in the outer rail holder include a guide roller moving on an outer side of the first rail and a guide roller moving on the inner side of the first rail, wherein the outer rail holder includes a roller holding portion configured to rotatably hold the guide rollers, wherein the outer rail holder includes a roller cover composed of a first cover member and a second cover member, wherein the first cover member is removably attached to the roller holding portion and covers the guide roller moving on the outer side of the first rail, and wherein the second cover member is removably attached to the roller holding portion and covers the guide roller moving on the inner side of the first rail.

2. The link mechanism according to claim 1, wherein the first cover member and the second cover member include an upper surface portion covering the roller holding portion and a side surface portion covering an outer peripheral surface of the guide roller.

3. The link mechanism according to claim 1, wherein the inner rail holder includes a roller cover configured to cover at least one of the plurality of guide rollers moving along the second rail.

4. A link device used in a stretching machine configured to stretch a film, the link device comprising:

rails; and a plurality of link mechanisms coupled to constitute an endless chain and configured to move along the rails, wherein each of the link mechanisms includes:

a base member;

an outer rail holder provided on one end side of the base member in a longitudinal direction and including a plurality of guide rollers moving along a first rail;

an inner rail holder provided on the other end side of the base member in the longitudinal direction and including a plurality of guide rollers moving along a second rail provided on an inner side of the first rail;

a link plate having one end in a longitudinal direction rotatably coupled to the outer rail holder and the other end in the longitudinal direction rotatably coupled to another link mechanism; and a clip provided on the one end side of the base member in the longitudinal direction where the outer rail holder is provided and configured to grip the film, wherein the plurality of guide rollers in the outer rail holder include a guide roller moving on an outer side of the first rail and a guide roller moving on the inner side of the first rail, wherein the outer rail holder includes a roller holding portion configured to rotatably hold the guide rollers, and wherein the outer rail holder includes a roller cover composed of a first cover member that is removably attached to the roller holding portion and covers the guide roller moving on the outer side of the first rail, and a second cover member that is removably attached to the roller holding portion and covers the guide roller moving on the inner side of the first rail.

5. The link device according to claim 4, wherein the inner rail holder in each of the link mechanisms includes a roller cover configured to cover at least one of the plurality of guide rollers moving along the second rail.

6. The link device according to claim 5, wherein the first cover member and the second cover member include an upper surface portion covering the roller holding portion and a side surface portion covering an outer peripheral surface of the guide roller.

7. A stretching machine configured to stretch a film, the stretching machine comprising:

a pair of link devices configured to convey and stretch the film, wherein each of the link devices includes rails and a plurality of link mechanisms coupled to constitute an endless chain and configured to move along the rails, wherein each of the link mechanisms includes:

a base member;

an outer rail holder provided on one end side of the base member in a longitudinal direction and including a plurality of guide rollers moving along a first rail;

an inner rail holder provided on the other end side of the base member in the longitudinal direction and including a plurality of guide rollers moving along a second rail provided on an inner side of the first rail;

a link plate having one end in a longitudinal direction rotatably coupled to the outer rail holder and the other end in the longitudinal direction rotatably coupled to another link mechanism; and a clip provided on the one end side of the base member in the longitudinal direction where the outer rail holder is provided and configured to grip the film, wherein the plurality of guide rollers in the outer rail holder include a guide roller moving on an outer side of the first rail and a guide roller moving on the inner side of the first rail, wherein the outer rail holder includes a roller holding portion configured to rotatably hold the guide rollers, and wherein the outer rail holder includes a roller cover composed of a first cover member that is removably attached to the roller holding portion and covers the guide roller moving on the outer side of the first rail, and a second cover member that is removably attached to the roller holding portion and covers the guide roller moving on the inner side of the first rail.

8. The stretching machine according to claim 7, wherein the inner rail holder in each of the link mechanisms includes a roller cover configured to cover at least one of the plurality of guide rollers moving along the second rail.

9. The stretching machine according to claim 8, wherein the first cover member and the second cover member include an upper surface portion covering the roller holding portion and a side surface portion covering an outer peripheral surface of the guide roller.

\* \* \* \* \*